United States Patent [19]

Kalyanaraman et al.

[11] Patent Number: 4,997,744

[45] Date of Patent: Mar. 5, 1991

[54] PROCESS FOR COATING A POLYCARBONATE OR POLYMETHYLMETHACRYLATE CONTAINING BASE

[75] Inventors: Palaiyur S. Kalyanaraman, Fanwood; David E. Nikles, Colonia, both of N.J.

[73] Assignee: Hoechst Celanese Corp., Somerville, N.J.

[21] Appl. No.: 287,012

[22] Filed: Dec. 21, 1988

Related U.S. Application Data

[63] Continuation-in-part of Ser. No. 162,445, Mar. 1, 1988, abandoned.

[51] Int. Cl.$^5$ .............................................. G03C 1/495
[52] U.S. Cl. ..................................... 430/271; 430/495; 430/533; 430/536; 430/964; 427/151; 427/160; 427/162
[58] Field of Search ............... 430/271, 495, 533, 536, 430/964; 8/506, 509, 611; 427/151, 160, 162

[56] References Cited

U.S. PATENT DOCUMENTS

| | | | |
|---|---|---|---|
| 3,974,177 | 8/1976 | Ische et al. | 540/137 |
| 4,121,014 | 10/1978 | Shaffer | 428/409 |
| 4,605,607 | 8/1986 | Nikles et al. | 430/322 |
| 4,725,525 | 2/1988 | Kenney et al. | 430/270 |

OTHER PUBLICATIONS

Encyclopedia of Chemical Technology, Third Edition, Kirk-Othmer, p. 382.

Handbook of Common Polymers, W. J. Roff, pp. 247–248.

Primary Examiner—Charles L. Bowers, Jr.
Assistant Examiner—Thomas R. Neville
Attorney, Agent, or Firm—Burns, Doane Swecker & Mathis

[57] ABSTRACT

Provided is a process and solvent solution for coating an aza-annulene chromophore containing film directly onto a polycarbonate or polymethylmethacrylate comprising base. In the process, a solution of the chromophore, e.g., phthalocyanine, porphyrin or naphthalocynine, is cast directly onto the polycarbonate or polymethylmethacrylate base, with the solvent used in formulating the solution comprising a $C_5$-$C_7$ cyclic alcohol, or a mixture of solvents including at least one of the aforementioned alcohols. The solvent is then removed, preferably by evaporation, in order to yield a smooth, homogeneous chromophore containing film directly on the polycarbonate or polymethylmethacrylate comprising base. This process is particularly applicable to the manufacture of optical recording media as the particular solvents employed in the process exhibit surprising and unique solvency characteristics with respect to aza-annulene chromophores, and do not attack polycarbonate or polymethylmethacrylate containing bases. The process therefore offers the advantage of being able to manufacture a medium employing a polycarbonate or polymethylmethacrylate substrate without the need for a subbing layer.

50 Claims, No Drawings

PROCESS FOR COATING A POLYCARBONATE OR POLYMETHYLMETHACRYLATE CONTAINING BASE

CROSS-REFERENCE TO RELATED APPLICATIONS

This application is a continuation-in-part of U.S. Ser. No. 162,445, filed Mar. 1, 1988, now abandoned.

BACKGROUND OF THE INVENTION

1. Field of the Invention

The present invention relates to a process for coating a chromophore containing film onto a polycarbonate or polymethylmethacrylate comprising base. More particularly, the present invention relates to a process for preparing an information recording medium employing a polycarbonate or polymethylmethacrylate comprising base, and a solvent solution for use in the process.

2. Description of the Prior Art

Optical recording methods in which light from the laser is focused upon the surface of a recording medium with sufficient intensity to cause a detectible change in the physical characteristics of the surface material have been proposed. Among these methods is the establishment of an information pattern of pits.

The information recording media which have been used in such optical recording methods involve the writing of information in a thin film of metal or the like formed on a substrate. See, e.g., U.S. Pat. No. 4,238,803. Dyes and pigments, however, have also been increasingly employed in information layers of recording media, often to enhance the sensitivity of the recording layers at the particular wavelength of the laser being used, which results in a much sharper recording and reading of the information. For example, see U.S. Pat. Nos. 4,622,179; 4,614,705; 4,605,607; 4,492,750; 4,529,688; 4,458,004; 4,298,975; 4,241,355; as well as European patent application No. 0188331.

The problems encountered in using chromophores in the information layers of optical media, among others, have generally involved difficult processing or film application problems. The dissolution of such chromophores in a suitable solvent has often been a problem which curtails the commercial expectations of a particular chromophore. Even when a suitable solvent has been found for the dissolution of a particular chromophore, however, problems have arisen with the casting of the chromophore solution onto a substrate. One of the biggest problems is the attacking of the substrate by the solvent. This has particularly been a problem with such suitable substrates as polycarbonate or polymethylmethacrylate comprising substrates. These two substrates are becoming well established as the most preferred substrates for applications involving optical recording media in light of their excellent optical properties and stability.

In general, "attacking the substrate" refers to the solvent changing the properties of the substrate so that it is no longer as useful for its intended purpose. The solvent interferes with the function of the substrate by adversely affecting the integrity of the surface geometry of the substrate either physically or chemically. Generally, the solvent dissolves, swells or otherwise adversely affects the substrate.

Besides the obvious physical damage which can result to the substrate, damage to a polycarbonate or polymethylmethacrylate containing substrate can also be more subtle, yet just as serious. The dissolving or swelling need not be major in order to result in a poorly defined or "graded" interface between the chromophore film and the substrate. It has been found that such a graded interface results in lower reflectivity, as well as a very non-uniform and noisy reflectivity, as the laser beam is focused at the interface. It is desired, therefore, that a well defined, very sharp, interface be achieved, which generally leads to a very high, uniform reflectivity.

It is also believed that unacceptable spectroscopic shifts in the optical properties of the information layer might be observed when a graded interface is created. This, of course, results in a loss of sensitivity since the information layer is therefore less precisely attuned to the laser wavelength. Moreover, chromophores become blended to a certain extent with the substrate through the attack or dissolution of the substrate, which results in a relative loss in sensitivity at the preselected laser wavelength vis-a-vis a pure chromophore layer precisely attuned to that laser wavelength.

Also, features such as holes, grooves, pits or bumps are generally molded into a substrate as preformat and tracking information. These features would be adversely affected by any swelling or partial obliteration resulting from the attack of a solvent. Such attacks cannot be tolerated, particularly in a commercialized process, as the preformatting and tracking information must survive the coating process.

One answer to this problem of the solvent attacking the substrate has been to use a subbing layer or coating over the substrate. Thus, the information layer containing the chromophore is cast onto the subbing layer which protects the substrate from the solvent used in formulating the chromophore solution. However, this involves the costly step of providing a subbing layer. Moreover, subbing layers are often designed to be very thin. Accordingly, pinholes often occur in the subbing layer, thereby allowing an attack of the substrate by the solvent in any event through the pinholes. Total protection of the substrate is therefore not always assured through the use of a subbing layer. As well, there is always the potential of a reaction between the subbing layer and the recording layer if the subbing layer is not carefully selected. The subbing layer can also limit the lifetime of the recording medium if it does not have suitable stability characteristics comparable to the substrate and recording layer. Therefore, the presence of the subbing layer can be detrimental from an archival standpoint if not carefully selected.

The use of a subbing layer does not therefore necessarily provide an acceptable or desirable solution to the problem of solvent attack on a substrate, and particularly a polycarbonate or polymethylmethacrylate comprising substrate. For all of the aforementioned reasons, it would be most beneficial and desirable if a less complicated system was used which eliminated the necessity for a subbing layer.

U.S. Pat. No. 4,639,745 employs what is in effect a subbing layer as protection for the substrate, but refers to it as a recording layer. The patent discloses an optical information medium which comprises a substrate and a first recording layer formed thereon. The first recording layer comprises a light-sensitive material which has been dissolved in a solvent that does not adversely affect the substrate. A second recording layer is then formed over the first recording layer.

In any event, a manufacturing process would be much more attractive if the use of a subbing layer, or a second recording layer, could be avoided altogether, and the chromophore containing solution for forming the active recording layer is cast directly onto the substrate.

Accordingly, it is an objective of the present invention to provide a process for coating a chromophore containing film directly onto a polycarbonate or polymethylmethacrylate comprising base without interfering with the function of the substrate, i.e., so as to maintain the integrity of the surface geometry of the substrate.

More particularly, it is an object of the present invention to provide a process for manufacturing an optical recording medium wherein a chromophore containing solution is cast directly onto a substrate without adversely affecting the substrate.

It is another object of the present invention to provide such a method for manufacturing an optical recording medium, wherein the optical recording medium comprises a polycarbonate or polymethylmethacrylate comprising base.

Still another object of the present invention is provide a unique solvent system for use in coating an aza-annulene chromophore film onto a polycarbonate or polymethylmethacrylate substrate.

Yet another object is to provide a method for safely and efficiently casting an aza-annulene film onto a polycarbonate of polymethylmethacrylate base.

These and other objects, as well as the scope, nature and utilization of the invention, will be apparent to those skilled in the art from the following description and the appended claims.

SUMMARY OF THE INVENTION

The foregoing objectives are realized by the present invention in providing a process for coating a smooth, homogeneous chromophore containing film directly onto a polycarbonate or polymethylmethacrylate comprising base, which process employs a specific solvent solution of the chromophore. The process is comprised of the steps of:

(i) providing a polycarbonate or polymethylmethacrylate comprising base;

(ii) providing a solvent solution in which an aza-annulene chromophore is dissolved, the solvent comprising a $C_5$–$C_7$ cyclic alcohol or a mixture of solvents including at least one of the foregoing alcohols;

(iii) casting the solvent solution directly onto the polycarbonate or polymethylmethacrylate comprising base; and (iv) removing the solvent to yield a smooth, homogeneous chromophore containing film directly on the polycarbonate or polymethylmethacrylate comprising base.

In the process of the present invention, it is preferred that the solvent is purely a $C_5$–$C_7$ cyclic alcohol, with cyclopentanol and cyclohexanol being the most preferred solvents.

In a most preferred embodiment, the process of the present invention is applied to the manufacture of an optical recording medium.

DETAILED DESCRIPTION OF THE PREFERRED EMBODIMENTS

The process of the present invention involves first providing a polycarbonate or polymethylmethacrylate comprising base. Such a polycarbonate or polymethylmethacrylate comprising base is particularly applicable to the manufacture of optical recording media, as polycarbonate and polymethylmethacrylate comprising bases have the mechanical and chemical properties which provide excellent substrates in optical media.

If a polycarbonate comprising base is employed, the polycarbonate base can be made from a composition which is totally a polycarbonate, or a blend or copolymer of a polycarbonate and another suitable polymer. For example, a polycarbonate can be blended with a polyvinyl aromatic polymer such as polystyrene, or a polyester, polyamide or polyacrylate. The polycarbonate can also be copolymerized, for example, as in U.S. Pat. No. 4,680,374. As well, the polycarbonate can be chemically modified in various manners, e.g., by the addition of functional groups to the polymer chain. Additives, such as antioxidants, can also be used to supplement the polycarbonate. See, e.g., U.S. Pat. No. 4,701,770.

The most preferred type or grade of polycarbonate for use as the substrate in an optical recording medium is a "CD grade" polycarbonate, which is well recognized in the industry. See, e.g., "Molding Compounds for Optical Disk Substrates" by Kato et al, SPIE, Vol. 695, Optical Mass Data Storage II (1986). This grade of polycarbonate has particularly desirable optical properties, including excellent optical transmittance and a capability to provide molded objects with low birefringence. Commercially, such grades of polycarbonates are available under the mark LEXAN and MAKROLON from General Electric and Mobay respectively. The polycarbonate used in preparing the substrate of an optical recording medium can be modified or supplemented as discussed above.

Similarly, if a polymethylmethacrylate comprising base is employed, the polymethylmethacrylate base likewise can be made from a composition which is totally a polymethylmethacrylate, or a blend or copolymer of polymethylmethacrylate and another suitable polymer. As well, the polymethylmethacrylate can be chemically modified, e.g., by the addition of functional groups to the polymer chain, or supplemented with the addition of additives, such as antioxidants.

An aza-annulene chromophore dissolved in a solvent is then provided in accordance with the present invention. The azaannulene chromophore is generally dissolved in an amount sufficient to achieve the desired purpose of coating the base with the chromophore. In a preferred embodiment of the present invention, the solvent solution is used in the preparation of an optical recording medium. The amount of aza-annulene chromophore dissolved in the solvent would therefore be an amount sufficient to provide a useful recording layer for optical recording.

The aza-annulene chromophore can be generally any suitable aza-annulene chromophore which has been found to have an application upon forming a coating on a substrate. Aza-annulene chromophores which are applicable in optical recording media applications, however, are most preferred. Preferred examples of such aza-annulene chromophores include phthalocyanine chromophores, such as substituted silicon, copper or vanadyl phthalocyanines, e.g., Olesol Fast Blue EL; porphyrins, such as substituted or unsubstituted tetraphenylporphyrins and octaethylporphyrins; and naphthalocyanine chromophores. Among the most preferred chromophores are naphthalocyanine compounds, particularly those which result in a smooth, homogeneous, defect-free, no-noise film upon casting on a substrate.

Among the preferred naphthalocyanine chromophores useful in the present invention are the naphthalocyanine chromophores of the following formula, containing the substituents as defined below:

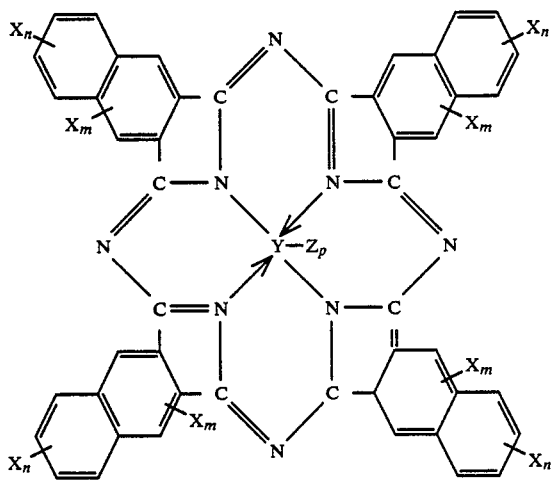

wherein Y is Si, Ge, Sn, Al, Ga, In or a transition metal, more preferably Si or Ge, and most preferably Si;

Z is halogen, hydroxy, $OR_1$ or $OSiR_2R_3R_4$,
wherein $R_1$ is an alkyl having at least four carbons; aryl having at least 6 carbons; acyl having at least 4 carbons; cycloalkyl having at least four carbons; or a polyether, and
wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;
with p representing the number of Z substituents and being either 0, 1 or 2, more preferably 1 or 2, and most preferably 2; and
wherein the X substituents can be the same or different and are independently selected from halogen; alkyl having at least 4 carbons; aryl having from 6 to 10 carbons; acyl having at least 4 carbons; $NR_5R_6$; $N_{02}$; $OR_7$; $SO_3^-$; or $SO_2NR_5R_6$,
with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the atom when the substituent is $NR_5R_6$,
$R_7$ is the same as $R_1$ defined above,
and with n and m indicating the number of independently selected X substituents, each n being the same or different and ranging from 0 to 4, and each m being the same or different and ranging from 0 to 2.

In the foregoing naphthalocyanine chromophores, when p is a value such that all of the valences of the central atom are not occupied with Z substituents, any other valence or valences of the central atom can be occupied by any conventional single valence substituent, e.g., hydrogen, halide or hydroxy.

It is preferred that there be at least one Z substituent in the naphthalocyanine chromophores of the present invention. Both types of substituents, however, X and Z, may be present.

The foregoing naphthalocyanine chromophores are uniquely suited for use in the recording layers of optical recording media, and are therefore preferred for such an application. These chromophores exhibit excellent chemical and photolytic stability, thereby rendering the chromophores extremely useful in the information layer of an optical recording medium. As well, the chromophores can exhibit unique spectral and solubility characteristics. These characteristics render the manipulation of the chromophore quite easy. Their excellent solubility characteristics can also be important if a polymer is to be used with the chromophore in formulating an information layer. As the chromophore becomes more compatible with the polymer, higher loading is achievable and the chance of phase separation is diminished. Solubility in the same solvent as the polymer used in the recording layer, if a polymer is desired to be used, also permits one to achieve higher loading of the chromophore in the recording layer, as well as to cast the chromophore/polymer using conventional techniques.

The foregoing naphthalocyanine chromophores of the present invention can also exhibit surprising film-forming properties, depending upon the substituents chosen, thereby allowing one the option of simply casting the chromophore without the need for a polymer. One is thereby able to realize the benefits of the thermomechanical properties of a film-forming material without the need for a polymer. This, in combination with the other unique characteristics of these chromophores renders the formulation of an information layer therefrom quite an easy task. As well, since the use of a polymer can be avoided, if desired, the problem of chromophore/polymer separation can be avoided.

The most preferred film-forming naphthalocyanine chromophores for use in the present invention are those chromophores within the aforedescribed general formula when
p is 1 or 2, and
Z is $(OSiR_8R_9)_kR_{10}$,
with $R_8$ and $R_9$ being the same or different and being an alkyl having from 1 to about 18 carbon atoms, and preferably from 1 to about 4 carbon atoms, or an aryl having from 6 to about 12 carbon atoms;
k is at least 1 and is preferably from 1 to about 50, and when p is 2, k may be different for each Z group; and,
with $R_{10}$ being a functionalized alkoxy; a functionalized alkoxy being defined as an alkoxy group containing additional functional units, i.e., functions containing atoms other than or in addition to C and H, with amide, ester, ether and alcohol functions being preferred additional functional units. More than one and/or a mixture of such additional functional units can be employed in the alkoxy group. The amide function is the most preferred additional functional unit. It is also most preferred that Y is Si in the foregoing naphthalocyanine chromophores Examples of preferred functionalized alkoxy groups ($R_{10}$) which can be employed include the following:

- O - $R_{11}$ - G - $R_{12}$;
- O - $R_{11}$ - G - $R_{13}$ - O - $R_{14}$; and
- O - $R_{11}$ - G - L - G$+R_{13}$ - G - L - G$+_jR_{13}$ - O - $R_{14}$ wherein $R_{11}$ is a divalent hydrocarbon radical in which the carbon atom attached to the oxygen is aliphatic, suitable examples being ethylene or phenethylene;

$R_{12}$ is alkyl, preferably having from one to eighteen carbon atoms, or aryl, preferably having from six to twelve carbon atoms;

$R_{13}$ is a divalent hydrocarbon radical;

$R_{14}$ is $R_{12}$ or H;

j is zero or greater, and preferably ranges from 0 to about 100;

G is a divalent radical containing atoms in addition to or in place of C and H, and is preferably an ether, ester or amide; and L is a divalent linking group such as a phenylene, diphenyl ether or polymethylene group, with 1,4-phenylene and 1,3-phenylene being among the preferred phenylene linking groups.

In the foregoing definitions, the alkyl groups can include branched and cyclic structures, as well as straight-chain structures.

Within the aforesaid parameters, preferred naphthalocyanine chromophores useful in the practice of the present invention include the following specific compounds:

SiNc[OSi(CH$_3$)$_2$-O(CH$_2$)$_2$OCO-p-C$_6$H$_4$COO(CH$_2$)$_{20}$H]$_2$
SiNc[OSi(CH$_3$)$_2$-O(CH$_2$)$_6$NHCOCH(CH$_3$)$_2$]$_2$
SiNc[OSi(CH$_3$)$_2$-O(CH$_2$)$_6$NHCOC(CH$_3$)$_3$]$_2$
SiNc[OSi(CH$_3$)$_2$-O(CH$_2$)$_6$NHCO(CH$_2$)$_{14}$CH$_3$]
SiNc[OSi(CH$_3$)$_2$-O(CH$_2$)$_3$NHCO(CH$_2$)$_8$CONH(CH$_2$)$_{30}$H]$_2$, and
SiNc[OSi(CH$_3$)$_2$-O(CH$_2$)$_3$NHCO-p-C$_6$H$_4$CONH(CH$_2$)$_{30}$H]$_2$.

As a general consideration in the selection of the $R_8$, $R_9$ and $R_{10}$ moieties employed in the Z substituents of the foregoing preferred film-forming naphthalocyanine chromophores, their structures are generally dictated by the requirement of processability. For example, to obtain a desired level of solubility in the solvents of the present invention, it is undesirable for all of the R moieties to have the minimum number of carbon atoms discussed above. On the other hand, two of the moieties may have the minimum number, provided the third has a sufficient number of carbon atoms, or other characteristics, to result in the desired solubility.

While the foregoing preferred film-forming naphthalocyanine chromophores are characterized by their unique Z substitution off of the central atom, substitution off of the naphthalene rings can also be desirable. As discussed briefly above, such ring substituents can be employed to alter the absorption maximum of the chromophore molecule. Examples of such substituents include sulfonamide, alkyl, aryl, ether, sulfonate salts, halogen, amine, nitro and acyl substituents. Preferably, the number and type of the ring substituents are selected so as to result in an absorption maximum for the chromophore which corresponds to the output wavelength of the laser to be used in the optical recording.

The aza-annulene chromophore composition employed in the practice of the present invention can be comprised of a single chromophore or a mixture of chromophores. It is preferred, however, that in any mixture employed, at least one phthalocyanine, porphyrin or naphthalocyanine chromophore be present. The chromophore composition can also comprise a suitable polymer, particularly a film-forming polymer, if so desired. Of course, both the chromophore and the polymer should be soluble in the solvent of the present invention in such a case.

The solvent employed in formulating the solvent solution in which the aza-annulene chromophore composition is dissolved is surprisingly not recognized as being a typical organic solvent. The solvent, for the purposes of the present invention comprises as C$_5$-C$_7$ cyclic alcohol, preferably monohydric, or a mixture of solvents including at least one such alcohol. It has been found that the foregoing alcohols, while not typical organic solvents, are surprisingly active in dissolving aza-annulene dyes and chromophores, particularly those useful in optical recording media. Yet, these cyclic alcohols do not attack either a polycarbonate or polymethylmethacrylate comprising substrate. As well, the foregoing alcohols are easily removed from the substrate to leave an uncontaminated chromophore layer on the polycarbonate or polymethylmethacrylate substrate. Their use is therefore quite uncomplicated, yet very effective. More conventional organic solvents, on the other hand, e.g., toluene and cyclohexanone, have been found to be quite unsuitable for the purposes of the present invention. Thus, the particular solvents of the present invention offer unique opportunities in the manufacture of film coated bases, and particularly, optical recording media.

If a polymer binder is to be employed together with the chromophore, the solvent has also been found to be quite active in dissolving the polymers together with the chromophore. The amount of solvent employed is that sufficient to dissolve a useful amount of chromophore (and polymer, if used).

The use of the foregoing solvents thereby permits a safe, yet simple and efficient process for coating or casting directly onto a polycarbonate substrate without harmful interaction with the polycarbonate substrate.

It is important that the C$_5$-C$_7$ cyclic alcohols be non-aromatic containing compounds, i.e., it is important that they do not contain an aromatic moiety. Compounds containing aromatic moieties have been found to be very detrimental to the objectives of the present invention, and hence are not considered within the purview of the present invention. It is also important that the compounds do not contain any halogenation for the same reason.

Among the preferred solvents are the unsubstituted cyclic alcohols cyclopentanol, cyclohexanol, and cycloheptanol, with cyclopentanol and cyclohexanol being most preferred.

Mixtures of solvents can be employed, as long as the mixture contains a major, effective amount of at least one solvent in accordance with the present invention. For example, a mixture of only solvents employable in the practice of the present invention may be used, or a mixture of at least one solvent useful in the practice of the present invention in combination with at least one other generally recognized solvent, such as methanol, can be employed. In the latter case, it is necessary that the solvent of the present invention be employed in an amount sufficient to avoid any harmful interaction with the polycarbonate comprising substrate.

It is most preferred for the purposes of the present invention, however, that a solvent system be employed which comprises but a single solvent.

Once the polycarbonate or polymethylmethacrylate comprising substrate and the solvent solution containing an azaannulene chromophore dissolved therein are provided, the solvent solution is cast directly onto the substrate. Any well known technique of casting a solvent solution can be used, with spin coating, however, being the preferred technique as it allows one to easily achieve a homogeneous film of desired thickness. The particular range of spin speeds useful in any particular instance can be readily optimized by the skilled artisan.

Once the solvent solution has been cast directly onto the polycarbonate or polymethylmethacrylate comprising base, the solvent is removed, preferably by evaporation, to yield a smooth, homogeneous chromophore containing film.

The present invention is further illustrated by the following examples. Details in the following examples, however, are in no way meant to be limitative, but are merely illustrative.

EXAMPLE I 80 g of Oleosol Fast Blue EL, a copper phthalocyanine dye available from Taoka Chemical Co., Ltd. Japan, was dissolved in 1920 g cyclopentanol with stirring under nitrogen overnight at 70° C. The blue solution was allowed to cool to room temperature and was then filtered through a 200 nm pore size membrane filter. The blue solution was then used to coat a series of 130 mm diameter polycarbonate substrates by a spin coating method.

EXAMPLE II

A. 0.5 g sample of $SiNc[OSi(CH_3)_2\text{-}O(CH_2)_6NHCO(CH_2)_{14}CH_3]_2$ was dissolved in 12 g cyclohexanol with stirring for four days at 70° C. followed by stirring for one day at room temperature. The solution was filtered through a 500 nm pore size membrane filter. The green filtrate was used to coat wedges cut from polycarbonate optical disk substrates. The following table summarizes the reflectance results for a sample coated at 1000 rpm spin coated speed.

| Wavelength (nm) | Air Incident | Substrate Incident |
| --- | --- | --- |
| 830 | 40.63% | 33.15% |
| 810 | 36.64% | 23.12% |
| 780 | 22.86% | 11.00% |

EXAMPLE III

A 1.4 g sample of $SiNc[OSi(CH_3)_2\text{-}O(CH_2)_6NHCO(CH_2)_{14}CH_3]_2$ was dissolved in 39.6 g cyclopentanol with stirring at room temperature overnight. The next morning this solution was filtered through a 200 nm pore size membrane filter. The filtrate was used to coat four polycarbonate optical disk substrates (samples IIIa-IIId) by spin coating at 2100 rpm. The following table summarizes the optical results for the samples.

| Sample | Substrate Incident at 830 nm | |
| --- | --- | --- |
| | Reflectance (%) | Transmittance (%) |
| IIIa | 23.9 | 12.6 |
| IIIb | 20.4 | 12.1 |
| IIIc | 20.4 | 12.2 |
| IIId | 20.4 | 12.2 |

EXAMPLE IV

A mixture of 0.55 g $SiNc[OSi(CH_3)_2\text{-}O(CH_2)_6NHCOCH(CH_3)_2]_2$ and 15.0 ml cyclopentanol was heated on a hot plate for two hours with stirring. The green solution was allowed to cool to room temperature and then filtered through a 200 nm pore size membrane filter. The filtrate was used to spin coat eight polycarbonate optical disk substrates (Samples IVa-IVh) using a spin speed of 2000 rpm. The disks were dried at 80° C. for two hours. The following table summarizes the substrate incident optical properties for the samples at 830 nm:

| Sample | Reflectance (%) | Transmittance (%) |
| --- | --- | --- |
| IVa | 29.0 | 11.4 |
| IVb | 28.7 | 11.1 |
| IVc | 29.1 | 11.1 |
| IVd | 29.2 | 11.1 |
| IVe | 29.2 | 11.3 |
| IVf | 29.2 | 11.2 |
| IVg | 29.2 | 11.0 |
| IVh | 29.2 | 11.7 |

EXAMPLE V

A mixture of 0.6 g $SiNc[OSi(CH_3)_2\text{-}O(CH_2)_6NHCO(CH_2)_{10}CH_3]_2$ and 20 ml of cyclopentanol were stirred at 50° C. for about one hour. The solution was then filtered through a 200 nm pore size membrane filter. The resulting green filtrate was spin coated on a polycarbonate optical disk substrate and dried at 80° C. for about one-half hour in a convection oven. The substrate incident reflectance was measured to be about 17.7%, and the transmittance was about 11.4% at about 830nm.

EXAMPLE VI

About 2.4 g of $SiNc[OSi(CH_3)_2\text{-}O(CH_2)_6NHCO(CH_2)_{14}CH_3]_2$ was dissolved in 80 ml of cyclopentanol, with the solution being filtered through a 200 nm pore size membrane filter. A second solution of 0.6 g of $SiNc[OSi(CH_3)_2\text{-}O(CH_2)_6NHCO(CH_2)_{10}CH_3]_2$ dissolved in 80 ml of cyclopentanol was then prepared and filtered through a 200 nm pore size membrane filter. 7g of each filtered solution was then mixed together, with the resulting solution being spin coated on a polycarbonate optical disk substrate and dried for about one-half hour at 80° C. The substrate incident reflectance was measured to be about 18.5%, at about 830 nm, and the transmittance was about 11.7%.

COMPARATIVE EXAMPLE I

A mixture of 0.5 g $SiNc[OSi(CH_3)_2\text{-}O(CH_2)_6NHCOCH(CH_3)_2]_2$ and 12 g benzyl alcohol was heated at a temperature of 70 to 80.C and stirred for 2 hours. The green solution was allowed to cool to room temperature and then filtered through a 200 nm pore size membrane filter. The green filtrate was used to spin coat two wedges cut from a polycarbonate optical disk substrate. The first wedge, sample CIa, was coated at 1500 rpm spin speed, and the second wedge, CIb, was coated at 2000 rpm. The coated samples were dried at 80° C. in a convection oven for 2 hours.

The following table summarizes the optical data, transmittance (T) and the reflectance ($R_s$, substrate incident and $R_f$, air incident) for the two samples. Notice that the reflectances are extremely low and the absorbance is highest at 780 nm. This indicates that the benzyl alcohol solution attacked the polycarbonate substrate during coating.

| Sample | CIa | CIb |
|---|---|---|
| wavelength - 780 nm | | |
| T | 6.89% | 12.76% |
| $R_s$ | 5.03% | 5.07% |
| $R_f$ | 1.23% | 2.77% |
| wavelength - 800 nm | | |
| T | 19.59% | 26.18% |
| $R_s$ | 5.02% | 5.08% |
| $R_f$ | 1.56% | 3.53% |
| wavelength - 830 nm | | |
| T | 51.52% | 43.45% |
| $R_s$ | 5.39 | 6.09% |
| $R_f$ | 2.03% | 4.46% |

COMPARATIVE EXAMPLE II

In this example, the solubility in weight percent (grams dye per 100 grams solvent) of several aza-annulene dyes in a solvent of the present invention was compared to the solubility of the aza-annulene dyes in several conventional organic solvents. The results are shown below:

| Aza-annulene dye: $SiNc[OSi(CH_3)_2-O(CH_2)_6NHCO(CH_2)_{14}CH_3]_2$ | |
|---|---|
| Solvent | Solubility |
| Cyclopentanol (invention) | 8.9% |
| 1-butanol (comparative) | 2.3% |
| Arcosolv PM (comparative-propylene glycol monomethyl ether) | 2.3% |

| Aza-annulene dye: $SiNc[OSi(CH_3)_2-O(CH_2CHCH_3O)_3CH_3]_2$ | |
|---|---|
| Solvent | Solubility |
| Cyclopentanol | 13.3% |
| 1-butanol | 1.9% |
| Arcosolv PM | 5.2% |

The foregoing results demonstrate the surprising and vastly superior solubility characteristics of the nonconventional solvents of the present invention with respect to aza-annulene dyes.

COMPARATIVE EXAMPLE III

In this example, a drop of a solvent was placed on a polymethylmethacrylate (PMMA) disk. The solvent either evaporated or was blotted off within three minutes. The disk was then viewed at 160X and 800X. Results are listed in the table below.

| Damage to Disk | No Damage to Disk |
|---|---|
| Methanol | n-butanol |
| Ethanol | cyclopentanol |
| Arcosolv PM (propylene glycol monomethyl ether) | |
| THF | |
| Acetone | |
| Cyclohexanone | |

The foregoing results demonstrate that the solvents of the present invention do not attack a PMMA comprising base, whereas many conventional organic solvents attack the PMMA base thereby rendering their use in coating a PMMA base inappropriate.

Although the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A process for coating a smooth, homogeneous chromophore containing film on a polycarbonate or polymethylmethacrylate comprising base, the process comprising the steps of:
   (i) providing a polycarbonate or polymethylmethacrylate comprising base;
   (ii) providing a solvent solution in which an azaannulene chromophore is dissolved, the solvent comprising a $C_5$–$C_7$ cyclic alcohol, or a mixture of solvents including at least one such alcohol
   (iii) casting the solvent solution directly onto the polycarbonate or polymethylmethacrylate comprising base; and
   (iv) removing the solvent to yield a smooth, homogeneous aza-annulene chromophore containing film directly on the polycarbonate or polymethylmethacrylate comprising base.

2. The process of claim 1, wherein the solvent comprises cyclopentanol.

3. The process of claim 1, wherein the solvent comprises cyclohexanol.

4. The process of claim 1, wherein the base is a polycarbonate comprising base.

5. The process of claim 4, wherein the base is a polycarbonate comprising base which is comprised of a blend of polycarbonate and another polymer.

6. The process of claim 5, wherein the polycarbonate comprising base is comprised of a blend of polycarbonate and a polyvinyl aromatic polymer.

7. The process of claim 6, wherein the polyvinyl aromatic polymer is a polystyrene.

8. The process of claim 1, wherein the chromophore comprises a phthalocyanine, porphyrin or naphthalocyanine compound.

9. The process of claim 8, wherein the chromophore comprises a naphthalocyanine compound.

10. The process of claim 9, wherein the naphthalocyanine compound is of the following general formula:

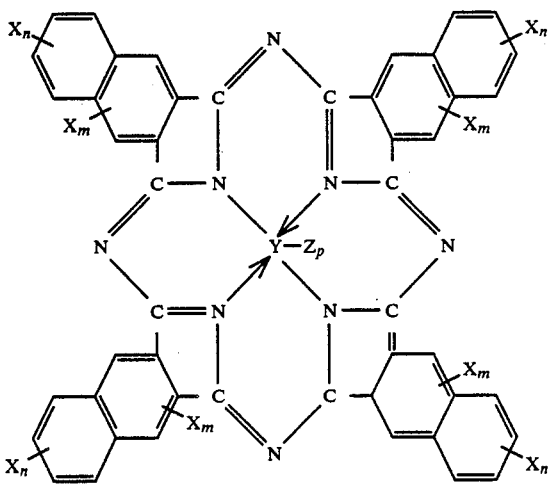

wherein Y is Si, Ge, Sn, Al, Ga, In or a transition metal,

Z is halogen, hydroxy, $OR_1$ or $OSiR_2R_3R_4$, wherein $R_1$ is an alkyl having at least four carbons; aryl having at least 6 carbons; acyl having at least 4 carbons; cycloalkyl having at least four carbons; or a polyether, and wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;

with p representing the number of Z substituents and being either 0, 1 or 2; and wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3$-; or $SO_2NR_5R_6$, with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the N atom when the substituent is $NR_5R_6$, $R_7$ is the same as $R_1$ defined above, and with n and m indicating the number of independently selected X substituents, each n being the same or different and ranging from 0 to 4, and each m being the same or different and ranging from 0 to 2.

11. The process of claim 10, wherein Y is Si.

12. The process of claim 10, wherein p is 1 or 2, and

Z is $(OSiR_8R_9)_kR_{10}$, with $R_8$ and $R_9$ being the same or different and being an alkyl having from 1 to about 18 carbon atoms, or an aryl having from 6 to about 12 carbon atoms;

k is at least 1, and when p is 2, k may be different group; and, with $R_{10}$ being a functionalized alkoxy.

13. The process of claim 12, wherein the alkyl of $R_8$ and $R_9$ contains from 1 to about 4 carbon atoms.

14. The process of claim 12, wherein k ranges from 1 to about 50.

15. The process of claim 12, wherein $R_{10}$ is a functionalized alkoxy group containing at least one amide, ester, ether or alcohol function.

16. The process of claim 15, wherein $R_{10}$ is of the general formula

- O - $R_{11}$ - G - $R_{12}$;
- O - $R_{11}$ - G - $R_{13}$ - O - $R_{14}$; or
- O - $R_{11}$ - G - L - G$+R_{13}$ - G - L - G$+_jR_{13}$ - O - $R_{14}$ wherein $R_{11}$ is a divalent hydrocarbon radical in which the carbon atom attached to the oxygen is aliphatic;

$R_{12}$ is alkyl or aryl;

$R_{13}$ is a divalent hydrocarbon radical;

$R_{14}$ is $R_{12}$ or H;

j is zero or greater;

G is a divalent radical containing atoms in addition to or in place of C and H; and L is a divalent linking group.

17. The process of claim 16, wherein $R_{12}$ is alkyl having from one to eighteen carbon atoms or aryl having from six to twelve carbon atoms.

18. The process of claim 16, wherein j ranges from 0 to about 100.

19. The process of claim 16, wherein G is an ether, ester or amide radical.

20. The process of claim 16, wherein L is 1,4-phenylene or 1,3-phenylene.

21. The process of claim 9, wherein the naphthalocyanine compound is comprised of SiNc[OSi(CH$_3$)$_2$-O(CH$_2$)$_2$OCO-p-C$_6$H$_4$COO(CH$_2$)$_{20}$H]$_2$ SiNc[OSi(CH$_3$)$_2$-O(CH$_2$)$_6$NHCOCH(CH$_3$)$_2$]$_2$ SiNc[OSi(CH$_3$)$_2$-O(CH$_2$)$_6$NHCOC(CH$_3$)$_3$]$_2$ SiNc[OSi(CH$_3$)$_2$-O(CH$_2$)$_6$NHCO(CH$_{14}$CH$_3$]$_2$ SiNc[OSi(CH$_3$)$_2$-O(CH$_2$)$_3$NHCO(CH$_2$)-$_8$CONH(CH$_2$)$_{30}$H]$_2$, or SiNc[OSi(CH$_3$)$_2$-O(CH$_2$)$_3$NHCO-p-C$_6$H$_4$CONH(CH$_2$)$_{30}$H]$_2$.

22. The process of claim 1, wherein the solvent solution contains a mixture of chromophore and a film forming polymer.

23. The process of claim 1, wherein the solvent solution is cast by spin coating.

24. The process of claim 1, wherein the solvent is removed by evaporation.

25. The process of claim 1, wherein the base is a polymethylmethacrylate base.

26. A process for manufacturing an optical recording medium comprised of a polycarbonate or polymethylmethacrylate comprising substrate having a smooth chromophore containing recording layer directly thereon, the process comprising the steps of:

(i) providing a polycarbonate or polymethylmethacrylate comprising substrate suitable for use in an optical recording medium;

(ii) providing a solution of an aza-annulene chromophore composition dissolved in a solvent, which aza-annulene chromophore composition is suitable as a recording layer in an optical recording medium, and wherein the solvent comprises a $C_{5-C7}$ cyclic alcohol, or a mixture of solvents including at least one such alcohol;

(iii) casting the solution directly onto the polycarbonate or polymethylmethacrylate comprising base; and, (iv) removing the solvent to leave a smooth, homogeneous chromophore containing recording layer directly on the substrate.

27. The process of claim 26, wherein the solvent comprises cyclopentanol.

28. The process of claim 26, wherein the solvent comprises cyclohexanol.

29. The process of claim 26, wherein the substrate is a polycarbonate comprising substrate.

30. The process of claim 29, wherein the polycarbonate comprising base is comprised of a blend of a polycarbonate and another polymer.

31. The process of claim 30, wherein the polycarbonate comprising base is comprised of a blend of a polycarbonate and a polyvinyl aromatic polymer.

32. The process of claim 31, wherein the polyvinyl aromatic polymer is a polystyrene.

33. The process of claim 26, wherein the substrate is a polymethylmethacrylate comprising substrate.

34. The process of claim 26, wherein the chromophore comprises a phthalocyanine, porphyrin or naphthalocyanine compound.

35. The process of claim 34, wherein the chromophore comprises a naphthalocyanine compound.

36. The process of claim 35, wherein the naphthalocyanine compound is of the following general formula:

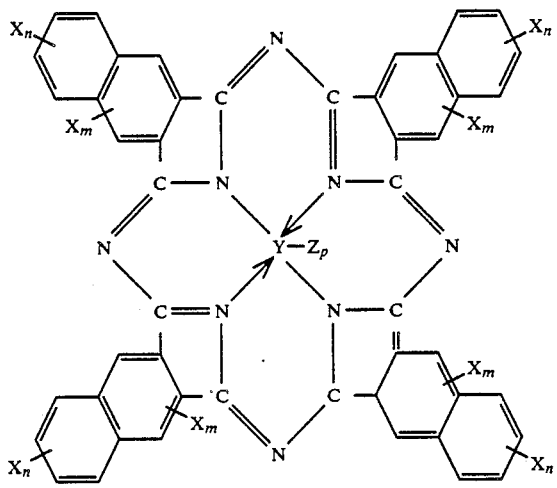

wherein Y is Si, Ge, Sn, Al, Ga, In or a transition metal,

Z is halogen, hydroxy, $OR_1$ or $OSiR_2R_3R_4$, wherein $R_1$ is an alkyl having at least four carbons; aryl having at least 6 carbons; acyl having at least 4 carbons; cycloalkyl having at least four carbons; or a polyether, and wherein $R_2$, $R_3$ and $R_4$ can be the same or different and are alkyl having from 1 to about 18 carbons; aryl having from 6 to 10 carbons; cycloalkyl having at least 4 carbons; siloxy; or alkoxy having at least 3 carbons;

with p representing the number of Z substituents and being either 0, 1 or 2; and wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3$-; or $SO_2NR_5R_6$, with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the N atom when the substituent is $NR_5R_6$, $R_7$ is the same as $R_1$ defined above, and with n and m indicating the number of independently selected X substituents, each n being the same or different and ranging from 0 to 4, and each m being the same or different and ranging from 0 to 2

37. The process of claim 36, wherein Y is Si.

38. The process of claim 36, wherein p is 1 or 2, and

Z is $(OSiR_8R_9)_k R_{10}$, with $R_8$ and $R_9$ being the same or different and being an alkyl having from 1 to about 18 carbon atoms, or an aryl having from 6 to about 12 carbon atoms;

k is at least 1, and when p is 2, k may be different for each Z group; and, with $R_{10}$ being a functionalized alkoxy.

39. The process of claim 38, wherein the alkyl of $R_8$ and $R_9$ contains from 1 to about 4 carbon atoms.

40. The process of claim 38, wherein k ranges from 1 to about 50.

41. The process of claim 38, wherein $R_{10}$ is a functionalized alkoxy group containing at least one amide, ester, ether or alcohol function.

42. The process of claim 41, wherein $R_{10}$ is of the general formula

- O - $R_{11}$ - G - $R_{12}$;
- O - $R_{11}$ - G - $R_{13}$ - O - $R_{14}$; or
- O - $R_{11}$ - G - L - G$+$$R_{13}$ - G - L - G$+_j$$R_{13}$ - O - $R_{14}$ wherein $R_{11}$ is a divalent hydrocarbon radical in which the carbon atom attached to the oxygen is aliphatic;

$R_{12}$ is alkyl or aryl;

$R_{13}$ is a divalent hydrocarbon radical;

$R_{14}$ is $R_{12}$ or H;

j is zero or greater;

G is a divalent radical containing atoms in addition to or in place of C and H; and L is a divalent linking group.

43. The process of claim 42, wherein $R_{12}$ is alkyl having from one to eighteen carbon atoms or aryl having from six to twelve carbon atoms.

44. The process of claim 42, wherein j ranges from 0 to about 100.

45. The process of claim 42, wherein G is an ether, ester or amide radical.

46. The process of claim 42, wherein L is 1,4-phenylene or 1,3-phenylene.

47. The process of claim 35, wherein the naphthalocyanine compound is comprised of SiNc[OSi(CH$_3$)$_2$-O(CH2)$_{20}$CO-p-C$_6$H$_4$COO(CH2)$_{20}$H]$_2$ SiNc[OSi(CH$_3$)$_2$-O(CH2)$_6$NHCOCH(CH$_3$)$_2$]$_2$ SiNc[OSi(CH$_3$)$_2$-O(CH2)$_6$NHCOC(CH$_3$)$_3$]$_2$ SiNc[OSi(CH$_3$)$_2$-O(CH2)$_6$NHCO(CH $_{14}$CH$_3$]$_2$ SiNc[OSi(CH$_3$)$_2$-O(CH2)$_3$NHCO(CH$_2$)-$_8$CONH(CH$_2$)$_{30}$H]$_2$, or SiNc[OSi(CH$_3$)$_2$-O(CH2)$_3$NHCO-p-C$_6$H$_4$CONH(CH$_2$)$_{30}$H]$_2$.

48. The process of claim 26, wherein the solvent solution contains a mixture of a chromophore and a film forming polymer.

49. The process of claim 26, wherein the solvent solution is cast by spin coating.

50. The process of claim 26, wherein the solvent is removed by evaporation.

* * * * *